(12) United States Patent
Wendte et al.

(10) Patent No.: US 9,723,779 B2
(45) Date of Patent: *Aug. 8, 2017

(54) MULTIPLE SEED-TYPE SEED METER

(71) Applicant: CNH Industrial America LLC, New Holland, PA (US)

(72) Inventors: Keith W. Wendte, Willowbrook, IL (US); Brian T. Adams, Centralia, MO (US)

(73) Assignee: CNH Industrial America LLC, New Holland, PA (US)

( * ) Notice: Subject to any disclaimer, the term of this patent is extended or adjusted under 35 U.S.C. 154(b) by 49 days.

This patent is subject to a terminal disclaimer.

(21) Appl. No.: 14/456,788

(22) Filed: Aug. 11, 2014

(65) Prior Publication Data

US 2016/0037713 A1    Feb. 11, 2016

(51) Int. Cl.
A01C 21/00    (2006.01)
A01C 7/04    (2006.01)
A01C 7/08    (2006.01)

(52) U.S. Cl.
CPC ............ *A01C 21/005* (2013.01); *A01C 7/046* (2013.01); *A01C 7/082* (2013.01)

(58) Field of Classification Search
CPC .... A01C 7/10; A01C 7/08; A01C 7/00; A01C 7/16; A01C 21/005; A01C 21/00; A01C 7/046; A01C 7/044; A01C 7/042; A01C 7/04; A01C 7/082; A01C 7/081
See application file for complete search history.

(56) References Cited

U.S. PATENT DOCUMENTS 3,731,842 A    5/1973    Schlegel
4,779,765 A    10/1988    Neumeyer
5,915,313 A    6/1999    Bender et al.
5,927,217 A    7/1999    Halford et al.
6,193,175 B1    2/2001    Andersson et al.
6,401,638 B1    6/2002    Crabb et al.
6,845,724 B2    1/2005    Mayerle et al.
7,353,760 B2    4/2008    Mayerle et al.
(Continued)

FOREIGN PATENT DOCUMENTS

WO    WO2013119459    1/2013

OTHER PUBLICATIONS

Raven multi-variety planter; Farming Industry News; http://farmindustrynews.com/planters/closer-look-industry-s-first-multi-hybrid-planter?NL=FIN-02&Issue=FIN-02__20130614_FIN-.
(Continued)

*Primary Examiner* — Christopher J Novosad
(74) *Attorney, Agent, or Firm* — Rebecca L. Henkel; Rickard K. DeMille

(57) ABSTRACT

A seed meter is provided for planting multiple types of seed and rapidly switching between the types being planted in a single planting pass of a planting session of row-crop planting. The seed meter has a segmented seed meter reservoir with multiple seed meter chambers arranged between two pairs of seed disks that may be better parallel to each other or angled with respect to each other to define an X-shaped arrangement of the seed disks in the seed meter. Activation and deactivation of the seed disks within the seed meter are synchronized to selectively deliver a single one of the multiple types of seed from the respective seed meter chamber for delivery out of a single seed tube of the seed meter, which may provide absolute and instantaneous on-the-go seed switching within a single row from each seed meter.

7 Claims, 8 Drawing Sheets

(56) References Cited

U.S. PATENT DOCUMENTS

| | | |
|---|---|---|
| 8,322,293 B2 | 12/2012 | Wollenhaupt et al. |
| 8,543,238 B2 | 9/2013 | Straeter |
| 8,942,894 B2 | 1/2015 | Garner et al. |
| 8,948,980 B2 | 2/2015 | Garner et al. |
| 2014/0165890 A1 | 6/2014 | Graham |
| 2014/0174330 A1 | 6/2014 | Garner et al. |
| 2015/0059629 A1 | 3/2015 | Kinzenbaw et al. |

OTHER PUBLICATIONS

Kinze multiple variety planter; website; http://www.kinze.com/article.aspx?id=167 &Kinze+Announces+the+World%27s+First+Electric+Multi-Hybrid+Concept+Planter.

MULTIPLE SEED-TYPE SEED METER

FIELD OF THE INVENTION

The invention relates generally to row-crop planters or planters and, in particular, to seed meters of planters for planting multiple varieties of seed.

BACKGROUND OF THE INVENTION

Modern farming practices strive to increase yields of agricultural fields. Technological advances of planters allow for better agronomic characteristics at the time of planting, such as providing more accurate seed depth, improved uniformity of seed depth across the planter, and improved accuracy of in-row seed spacing. However, a single field can have performance inconsistencies between different areas. That is because a field can have a wide variety of soil types and management zones such as irrigated and non-irrigated zones in different areas. Seed companies are developing multiple varieties of each of their seed product types, with the different varieties offering improved performance characteristics for different types of soil and management practices. Efforts have been made to plant multiple varieties of a particular seed product type in different areas of fields with different soil types or management zones. These efforts include planters that have different bulk fill hoppers and require the reservoir for each seed meter to be completely cleaned out or planted out before a different seed variety can be delivered to the seed meters. Some planters allow for planting two varieties and include two separate and distinct seed meters at every row unit.

SUMMARY OF THE INVENTION

The present invention is directed to a seed meter that has multiple, which may include four, internal seed disk assemblies that allow for absolute and instantaneous switching seed types being planted during a single planting pass, without requiring multiple seed meters at every row unit or emptying out or planting out a first seed type before switching to a different seed type. The seed meter has multiple seed disk assemblies which may include, for example, two pairs of seed disks in the seed meter housing for selectively planting up to four seed types. The seed meter is configured to activate a single seed disk and deactivate the others so that only seeds conveyed by the activated seed disk are delivered out of the seed meter for planting at a given time or can be controlled to provide a mix of seed types. By on-the-move synchronizing of activating and deactivating of the different seed disks within the seed meter, an absolute and instantaneous switching of the seed type being planted within a single row can be achieved which may include changing or adjusting delivery of mixed seed types in a highly controllable manner. In one embodiment, this may achieved by synchronizing of activating and deactivating of the different seed disks within the seed meter to provide alternate delivery of different types of seed to provide a mixed distribution.

According to one aspect of the invention, a seed meter is provided for planting multiple types of seed in a single planting pass during row-crop planting of an agricultural field. The seed meter has a housing supported relative to a row unit of a planter and having multiple portions defining multiple seed chambers respectively receiving seeds of multiple types from a bulk storage system. Multiple seed disk assemblies selectively deliver individual seeds of the different multiple seed types out of the housing for release onto an agricultural field during row-crop planting of the agricultural field. The multiple portions of the housing may include a first portion defining a first seed chamber for receiving seeds of a first type, a second portion defining a second seed chamber for receiving seeds of a second type, a third portion defining a third seed chamber for receiving seeds of a third type, and a fourth portion defining a fourth seed chamber for receiving seeds of a fourth type. This allows for multiple types of seed to be fed to and maintained separately within a seed meter for selective release in different types or variety zones of an agricultural field defined at least in part by characteristics relating to soil and/or management type.

According to another aspect of the invention, a seed disk drive system is configured for activating and deactivating the multiple seed disk assemblies for selectively delivering a corresponding one of the first, second, third, and fourth seed types out of the housing during row-crop planting of the agricultural field. The seed disk drive system selectively activates the first seed disk to rotate within the housing for conveying seeds of the first seed type through the housing, the second seed disk to rotate within the housing for conveying seeds of the second seed type through the housing, the third seed disk to rotate within the housing for conveying seeds of the third seed type through the housing, and the fourth seed disk to rotate within the housing for conveying seeds of the fourth seed type through the housing. This allows for a compact configuration of a seed meter that can instantaneously switchover between planting seeds of multiple different types, during which at a seed-type switching event, release of a final seed of the one seed type is sequentially followed by an initial seed of another seed type, even within a single row without creating a skip event to provide constant in-row seed spacing through the seed-type switching event.

According to another aspect of the invention, the first and second seed disks define a first pair of the seed disks generally transversely aligned with each other within the housing of the seed meter and the third and fourth seed disks define a second pair of the seed disks generally transversely aligned with each other within the housing of the seed meter. In this arrangement, the seed disks of each of the first and second pairs can sit generally side-by-side with respect to each other in the meter housing. The side-by-side seed disks may be arranged so that the seed disks of the first pair are generally parallel to each other within the housing of the seed meter and the seed disks of the second pair are generally parallel to each other within the housing of the seed meter. The side-by-side seed disks may be arranged so that the seed disks of the first pair are at an angle with respect to each other within the housing of the seed meter and the seed disks of the second pair are at an angle with respect to each other within the housing of the seed meter. In one embodiment, the first and second pairs of seed disks converge toward each other over a seed tube configured for receiving seeds released from each of the first, second, third, and fourth seed disks. This provides an X-shaped arrangement of the seed disks within the meter housing, with a projected point or area of intersection of the X-shaped arrangement aligned over an upper opening of a single seed tube. This multiple seed disks configured to release seed at substantially the same seed release location within the seed meter housing for delivery out of a single seed tube, which reduces seed bounce within the seed tube and improves seed delivery consistency onto the agricultural field.

According to another aspect of the invention, a planter is provided for planting multiple types of seed in a single planting pass during row-crop planting of an agricultural field. The planter includes a frame, a bulk storage system supported by the frame and configured for storing multiple types of seeds. Multiple row units are supported by the frame. In one embodiment, each of the multiple row units has an on-row storage system with multiple compartments configured to receive respective ones of the multiple types of seed from the bulk storage system, and a seed meter for planting the multiple types of seed. Each seed meter has a housing having multiple portions defining multiple seed chambers respectively receiving seeds of multiple types from the multiple compartments of the on-row storage system and multiple seed disk assemblies. The multiple seed disk assemblies selectively deliver individual seeds of the multiple seed types from the multiple seed chambers of the seed meter out of the housing for release onto an agricultural field during row-crop planting of the agricultural field.

According to another aspect of the invention, at each row unit, the multiple compartments of the on-row storage system are defined by multiple mini-hopper chambers of a mini-hopper arranged to deliver seeds to the seed meter. In one embodiment, the multiple mini-hopper chambers include a first mini-hopper chamber arranged to deliver seeds of the first variety to the first seed chamber of the seed meter, a second mini-hopper chamber arranged to deliver seeds of the second variety to the second seed chamber of the seed meter, a third mini-hopper chamber arranged to deliver seeds of the third variety to the third seed chamber of the seed meter, and a fourth mini-hopper chamber arranged to deliver seeds of the fourth variety to the fourth seed chamber of the seed meter.

According to another aspect of the invention, the planter includes a diverter configured to selectively direct seeds of the first, second, third, and fourth type to respective ones of the first, second, third, and fourth mini-hopper chambers. In one embodiment, the diverter includes diverter outlet ducts and a gate system having gates actuatable to close or open the outlet ducts of the diverter to respectively block or permit flow through passages extending through the outlet ducts into the first, second, third, and fourth mini-hopper chambers. The diverter may be mounted with the diverter outlet ducts connected to inlets of the first, second, third, and fourth mini-hopper chambers. This may provide the diverter at the mini-hopper, itself. The diverter may be arranged upstream with respect to the mini-hopper. In this arrangement, the diverter may be connected to or mounted within a primary seed conduit receiving seeds from the bulk storage system. In this arrangement, the diverter outlet ducts may connect to secondary seed conduits extending from the diverter outlet ducts to respective ones of inlets of the first, second, third, and fourth mini-hopper chambers. This provides a system for feeding seeds of different types through a single primary seed conduit while separately storing and delivering the different types of seed to separate multiple seed chambers of the seed meter.

Other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE PREFERRED EMBODIMENTS

Figure 1:
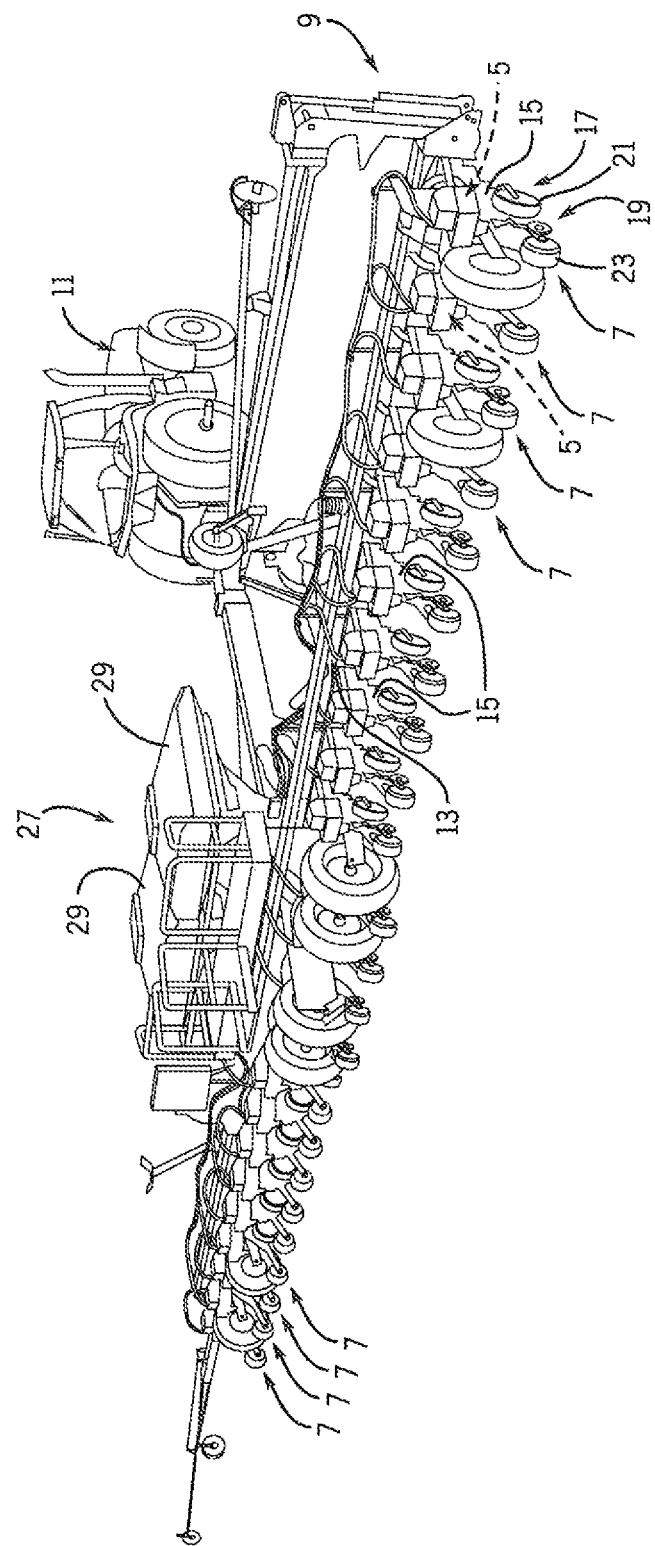
FIG. 1 illustrates a pictorial view of a planter incorporating a seed meter in accordance with the present invention.
Figure 2:
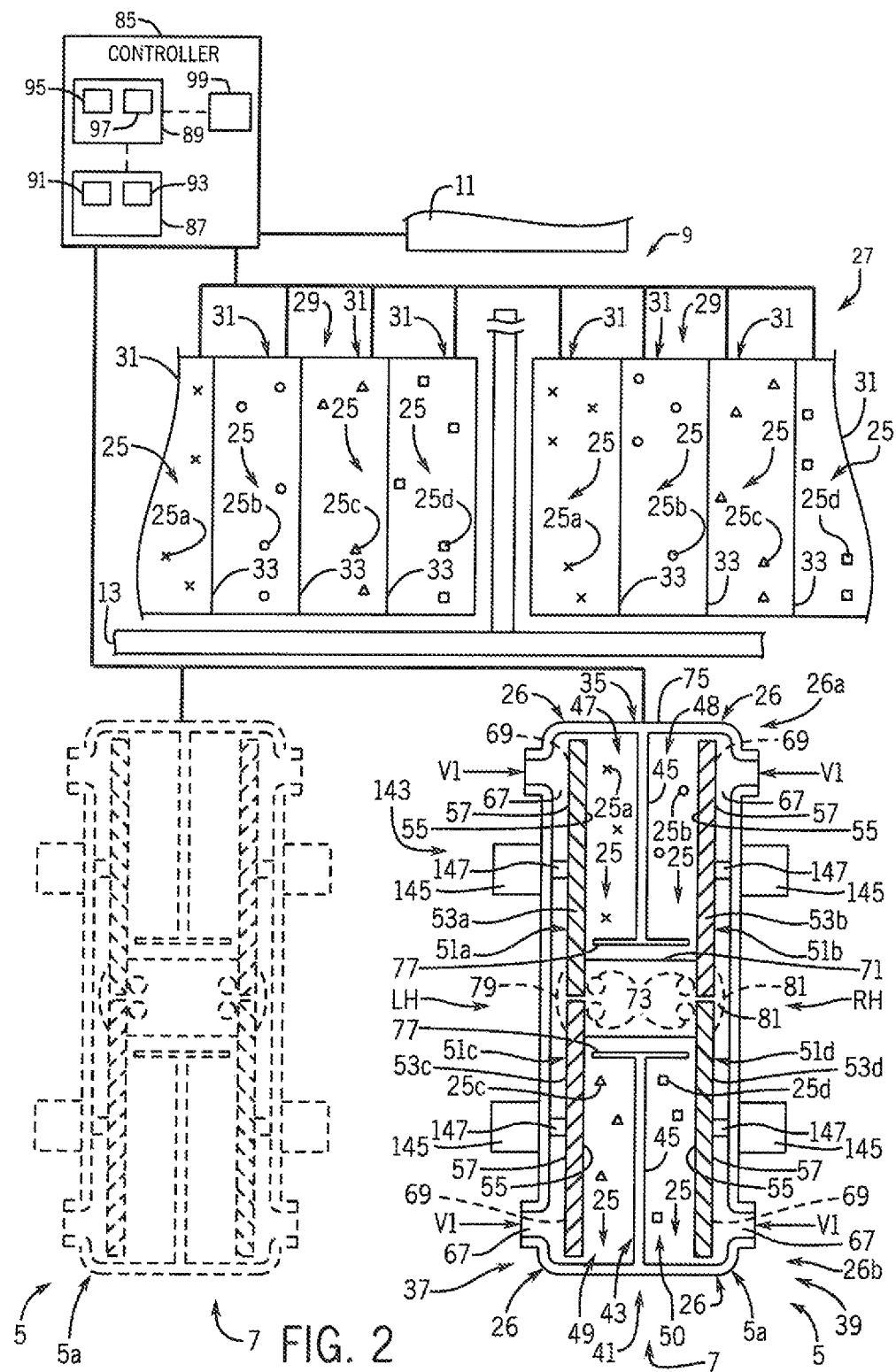
FIG. 2 illustrates a simplified schematic view of portions of the planter of FIG. 1 and cross-sectional representation of a seed meter(s) in accordance with the present invention.
Figure 3:
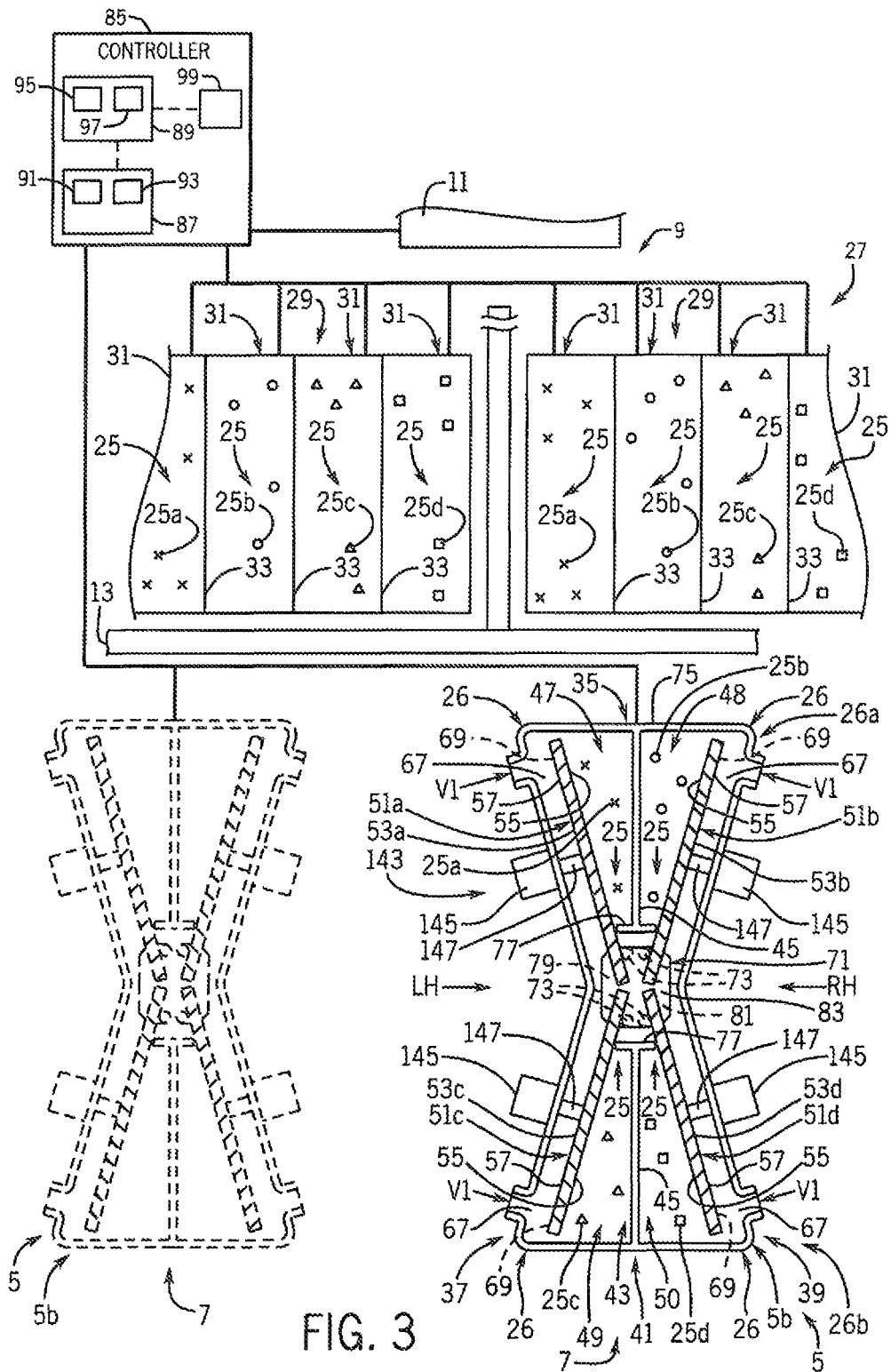
FIG. 3 illustrates a variant of the seed meter(s) of FIG. 2.

Referring now to the drawings and specifically to FIG. 1 and the simplified schematic representations of FIGS. 2 and 3, seed meters 5 of row units 7 of a planter 9 are configured for planting multiple types or varieties of seed. As explained in greater detail elsewhere herein, each seed meter 5 can switch, for example, absolutely, instantaneously, and automatically, between planting of different types or varieties of seed during a single planting pass of row-crop planting of an agricultural field with the planter 9. Planter 9 may be one of the EARLY RISER® series planters available from Case IH and is typically pulled by a traction device such as a tractor 11. The planter 9 has a frame 13 that supports the multiple row units 7 that are substantially identical. Each row unit 7 includes a respective seed meter 5 and various support components for supporting the seed meter 5 and corresponding ground-engaging components.

Referring now to FIG. 1, such support components include a sub-frame 15 that is connected to the frame 13 of the planter 9 by way of a known parallel linkage system 16 (FIGS. 6 and 7) and supports the seed meter 5 and furrow opening 17 and closing mechanisms 19 toward front and back ends of the row unit 7. The opening and closing mechanisms 17, 19 may include opener disks and closing disks, respectively, or other ground-engaging tools for opening and closing a furrow. Each row unit 7 may include a gauge wheel 21 configured for adjusting furrow depth by limiting soil penetration of the furrow-opening mechanism 17 while creating a furrow, and a press wheel 23 may be arranged to roll over the closed furrow to firm the soil over the seed to further close the furrow and promote favorable seed-to-soil contact.

Referring now to FIGS. 2 and 3, in these embodiments, seeds 25 are held in bulk storage in a bulk storage system 27 with at least one bulk fill hopper 29, shown here in each of FIGS. 2 and 3 as having two central bulk fill hoppers 29 supported by the frame 13 of the planter 9. The bulk storage system 27 has multiple compartments 31, shown here as spaces within each of the bulk-fill hoppers 29 that are separated by divider walls or partitions 33. In another embodiment, the compartments 31 are defined by separate and discrete containers themselves, such as multiple bulk fill hoppers 29. In some embodiments, such as those shown in FIGS. 6 and 7, at least some of the bulk fill hoppers 29 are not centrally located with respect to the planter 9 and remote from the row units 7, but are mounted on the row units 7 themselves in a gravity-feed relationship with the respective seed meters explained in greater detail elsewhere herein. Regardless of where the hoppers 29 are located, the different compartments 31 of the hoppers 29 may hold seeds 25 of a common plant type but different varieties or types 25*a*, 25*b*, 25*c*, 25*d* for planting in different type or variety zones of an agricultural field defined at least in part by characteristics relating to at least one of soil type and management type. Although the seed 25 may be described elsewhere herein as different types 25*a*, 25*b*, 25*c*, 25*d*, it is understood that the description of the different types includes different varieties. In other words, the different types 25*a*, 25*b*, 25*c*, 25*d* of seed 25 include not only different varieties of the same plant species, but also different seed products. Different seed products can include seeds of different species, coated and uncoated seeds, such as insecticide coated and non-insecticide coated seeds. The different seed products can also include refuge in a bag seed and non-refuge in a bag seed, plant-parasite resistant seed and non-plant-parasite resistant seed such as cyst nematodes resistant seeds and non-cyst nematodes resistant seeds, herbicide-tolerant seed and non-herbicide tolerant seed, or other different products. The different seed products can further include different crop seeds such as corn and soybeans.

Still referring to FIGS. 2 and 3, two exemplary arrangements of seed meters 5 are shown in the two row units 7 as seed meters 5*a* and 5*b* in FIGS. 2 and 3 respectively, each of which can plant multiple types or varieties of seed. Each seed meter 5 is shown with four and thus two pairs, of metering assemblies 26 for singulating and selectively delivering different types 25*a*, 25*b*, 25*c*, 25*d* of seed 25 from the seed meter 5. Of the two pairs of metering assemblies 26 within each seed meter 5, as represented in FIGS. 2 and 3, a first or forward pair 26*a* of metering assemblies 26 is relatively closer to the tractor 11 and a second or rearward pair 26*b* of metering assemblies 26 is relatively further from the tractor 11. The metering assemblies 26 toward the left-hand side of the seed meter 5 are generally longitudinally aligned with each other and the metering assemblies 26 toward the right-hand side of the seed meter 5 are generally longitudinally aligned with each other. Regardless of how the metering assemblies 26 are arranged within each seed meter 5, each seed meter 5 is operably connected to an airflow system 34 (FIGS. 4 and 5) that includes a positive air pressure source and a vacuum source for establishing positive and vacuum pressures and corresponding air flows for delivery seed 25 to the seed meters 5 and for moving the seeds 25 through the seed meter 5. The positive air pressure source and vacuum sources can be known pumps, fans, blowers, and/or other known airflow system components. Each seed meter 5 has a housing 35 defining the first and second side portions 37, 39 shown as including a left-hand cover (LH) and a right-hand cover (RH). In the seed meters 5*a*, 5*b* of FIGS. 2 and 3, with the transversely arranged metering assemblies 26, each of the left-hand and right-hand covers LH, RH has a vacuum inlet (VI) for connecting the first and second side portions 37, 39 to the vacuum source of the airflow system 34. Each of the left-hand and right hand covers LH, RH is shown with two vacuum inlets VI for connecting the first side portion 37 to the vacuum source at two locations, with each vacuum inlet VI providing vacuum pressure to a respective metering assembly 26 of the seed meter 5. An intermediate portion 41 of the housing 35 is arranged between the first and second side portions 37, 39.

Still referring to FIGS. 2 and 3, each seed meter 5 has a seed meter reservoir 43 that defines a multiple chamber or quadrant-split reservoir in the interior of the seed meter 5. At the forward pair 26*a* of metering assemblies 26, a separator wall 45 within the seed meter reservoir 43 separates the seed meter reservoir 34 into a first seed chamber 47 storing seeds of the first type 25*a* and a second seed chamber 48 storing seeds of the second type 25*b* within seed meter housing 35. At the rearward pair 26*b* of metering assemblies 26, a separator wall 45 within the seed meter reservoir 43 separates the seed meter reservoir 34 into a third seed chamber 49 storing seeds of the third type 25*c* and a fourth seed chamber 50 storing seeds of the fourth type 25*d* within seed meter housing 35.

Still referring to FIGS. 2 and 3, the forward pair 26*a* of metering assemblies 26 includes a first seed disk assembly 51*a* having a first seed disk 53*a* arranged within the first side portion 37 of the seed meter housing 35 and a second seed disk assembly 51*b* having a second seed disk 53*b* arranged within the second side portion 39 of the seed meter housing 35. The rearward pair 26*b* of metering assemblies 26 includes a third seed disk assembly 51*c* having a third seed disk 53*c* arranged within the first side portion 37 of the seed meter housing 35 and a fourth seed disk assembly 51*d* having a fourth seed disk 53*d* arranged within the second side portion 39 of the seed meter housing 35. In this arrangement, the first and third seed disks assemblies 51*a*, 51*c* are generally a longitudinally aligned with each other within the first side portion 37 of the seed meter housing 35. The second and fourth seed disk assemblies 51*b*, 51*d* are generally longitudinally aligned with each other within the second side portion 39 of the seed meter housing 35.

Still referring to FIGS. 2 and 3, each of the seed disks 53*a*, 53*b*, 53*c*, and 53*d* has an inwardly facing surface 55 facing toward and defining transverse outer peripheries of the first, second, third, and fourth seed chambers 47, 48, 49, 50. Outwardly facing surfaces 57 of the seed disks 53*a*, 53*b*, 53*c*, 53*d* face toward and are spaced from the respective the left-hand and right-hand covers LH, RH of the first and second side portions 37, 39 of the seed meter housing 35. This provides vacuum pressure chambers 67 between each of the outwardly facing surfaces 57 of the first and third seed disks 53*a*, 53*c* and the left-hand cover LH and between each of the outwardly facing surfaces 57 of the second and fourth seed disks 53*b*, 53*d* and the right-hand cover RH of the seed meter housing first and second side portions 37, 39. The vacuum pressure in the vacuum pressure chamber(s) 67 allows seeds 25 to be drawn and held against the seed pockets and/or holes 69 of the seed disks 53*a*. 53*b*, 53*c*, 53*d* to rotatably convey the seeds 25 through the seed meter housing 35 to be released from the seed disk(s) 53*a*, 53*b*, 53*c*, 53*d* within a discharge segment 71 at release locations 73 in the seed meter housing 35.

Still referring to FIGS. 2 and 3, the discharge segment 71 of the seed meter 5 is defined rearwardly of a forward facing wall 75 of the seed meter housing 35, between the inwardly facing surfaces 55 of the of the seed disks 53*a*, 53*b*, 53*c*, 53*d* and divider walls 77 extending from ends of the separator walls 45. Each divider wall 77 extends transversely in opposite directions beyond the end of the respective separator wall 45. In this way, a first divider wall 77 extends in a transverse direction through the interior of the housing 35, across a front portion of the seed meter reservoir 43 between the first and second seed disks 53a, 53b. A second divider wall 77 extends in a transverse direction through the interior of the housing 35, across a rear portion of the seed meter reservoir 43 between the third and fourth seed disks 53c, 53d.

Referring now to FIG. 2, the seed disk assemblies 51a, 51b, 51c, 51 d are arranged in straight-line alignment and parallel relationships relative to respective ones of each other. Within the forward pair 26a of metering assemblies 26 of the seed meter 5, the seed disk assemblies 51a, 51b and seed disks seed disks 53a, 53b are transversely aligned and arranged parallel to each other. Within the rearward pair 26b of metering assemblies 26 of the seed meter 5, the seed disk assemblies 51c, 51d and seed disks seed disks 53c, 53d are transversely aligned and arranged parallel to each other. The seed disk 53c is directly behind and in straight-line alignment with the seed disk 53a. The seed disk 53d is directly behind and in straight-line alignment with the disk 53b.

As shown in FIG. 3, the seed disk assemblies 51a, 51b, 51c, 51d are arranged in angled relationships relative to respective ones of each other to define an X-shaped arrangement within the meter housing 35, with a projected point or area of intersection of the X-shaped arrangement aligned at the discharge segment 71 in the seed meter housing 35. Within the forward pair 26a of metering assemblies 26 of the seed meter 5, the seed disk assemblies 51a, 51b and seed disks seed disks 53a, 53b are transversely aligned and arranged at an angle with respect to each other, whereby axes of rotation of the seed disks 53a, 53b intersect to define an included angle of less than 180°. Within the rearward pair 26b of metering assemblies 26 of the seed meter 5, the seed disk assemblies 51c, 51d and seed disks seed disks 53c, 53d are transversely aligned and arranged at an angle with respect to each other, whereby axes of rotation of the seed disks 53c, 53d intersect to define an included angle of less than 180°.

When comparing the two embodiments seed meters 5 shown as seed meters 5a and 5b of FIGS. 2 and 3 with the forward and rearward pairs 26a, 26b of metering assemblies 26 generally transversely aligned and parallel or angled with respect to each other, respectively, the angled seed disks 53a, 53b, 53c, 53c of seed meter 5b in FIG. 3 have release locations 73 that are longitudinally aligned and transversely spaced and relatively closer to each other than the longitudinally aligned and transversely spaced release locations 73 of the arrangement shown in seed meter 5a of FIG. 2. Regardless of whether the seed disks 53a, 53b, 53c, 53d are arranged parallel or angled with respect to each other, the release locations 73 within the seed meter 5 allow for dropping the seed 25 from the respective seed disks 53a, 53b, 53c, 53d through an outlet 79 of the seed meter housing 35 and into an inlet 81 of a common single seed tube 83 that delivers the seed 25 onto the agricultural field. This arrangement allows for selective release of one of the seed types 25a, 25b, 25c, 25d at a given time and/or a given area of an agricultural field, as controlled by a control system 85.

Still referring to FIGS. 2 and 3, the control system 85 controls selective delivery of the seed types 25a, 25b, 25c, 25d out of the seed meter(s) 5 and initial delivery of the seed types 25a, 25b, 25c, 25d from the compartments 31 of the bulk fill hoppers 29 to the first, second, third, and fourth seed chambers 47, 48, 49, 50 of the seed meter reservoir(s) 43. Control system 85 includes a planter controller 87 and a tractor controller 89 that operably communicate with each other, for example, by way of an ISOBUS connection, for coordinating controls of planter 9 such as the seed meters 5 and tractor 11 (FIG. 1) based on the type or variety zones VZ1, VZ2, VZ3, VZ4 of the agricultural field, which may correspond to a seed type or variety prescription map PM as shown in FIG. 5.

Still referring to FIGS. 2 and 3, the planter controller 87 is shown including a controller 91 and a power supply 93. The controller 91 of the planter controller 87 can include an industrial computer or, e.g., a programmable logic controller (PLC), along with corresponding software and suitable memory for storing such software and hardware including interconnecting conductors for power and signal transmission for controlling electronic, electro-mechanical, and hydraulic components of the seed meter 5 and other components of the planter 9. The tractor controller 89 is configured for controlling operations of the tractor 11 such as controlling steering, speed, braking, shifting, and other operations of the tractor 11. The tractor controller 89 is shown as including a controller 95 and power supply 97. The tractor controller 89 is configured for controlling the functions of the tractor 11 by controlling the various GPS steering, transmission, engine, hydraulic, and/or other systems of the tractor 11. Like the controller 91 of the planter controller 87, the controller 95 of the tractor controller 89 can include an industrial computer or, e.g., a programmable logic controller, along with corresponding software and suitable memory for storing such software and hardware including interconnecting conductors for power and signal transmission for controlling electronic, electro-mechanical, and hydraulic components of the tractor 11. A tractor interface system 99 is operably connected to the tractor controller 89 and includes a monitor and various input devices to allow an operator to see the statuses and control various operations of the tractor 11 from within the cab of the tractor 11. The tractor interface system 99 may be a MultiControl Armrest™ console available for use with the Maxxum™ series tractors from Case IH.

Figure 4:
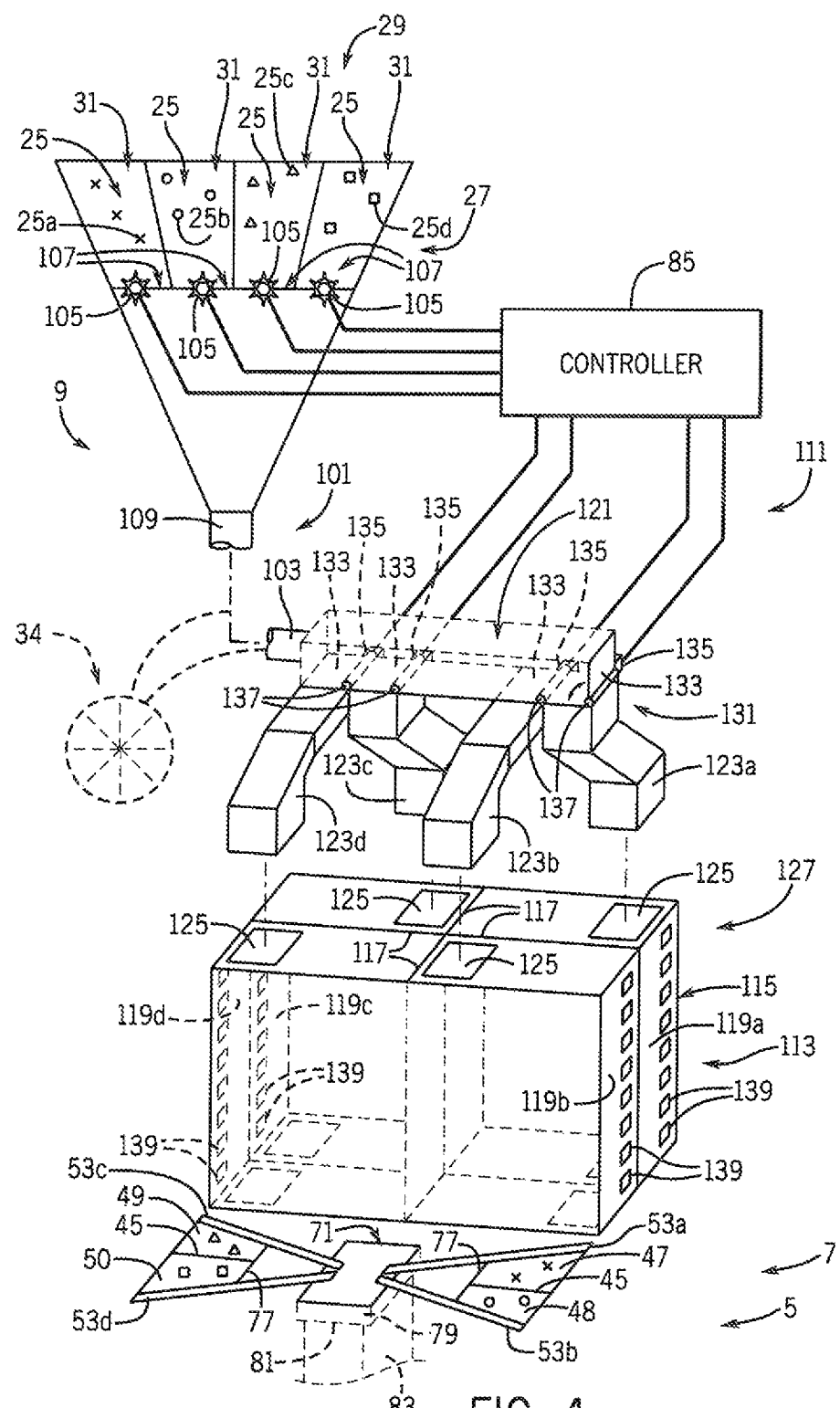
FIG. 4 illustrates a simplified schematic view of the planter of FIG. 1 with the seed meter of FIG. 3 and a diverter system in accordance with the present invention.
Figure 5:
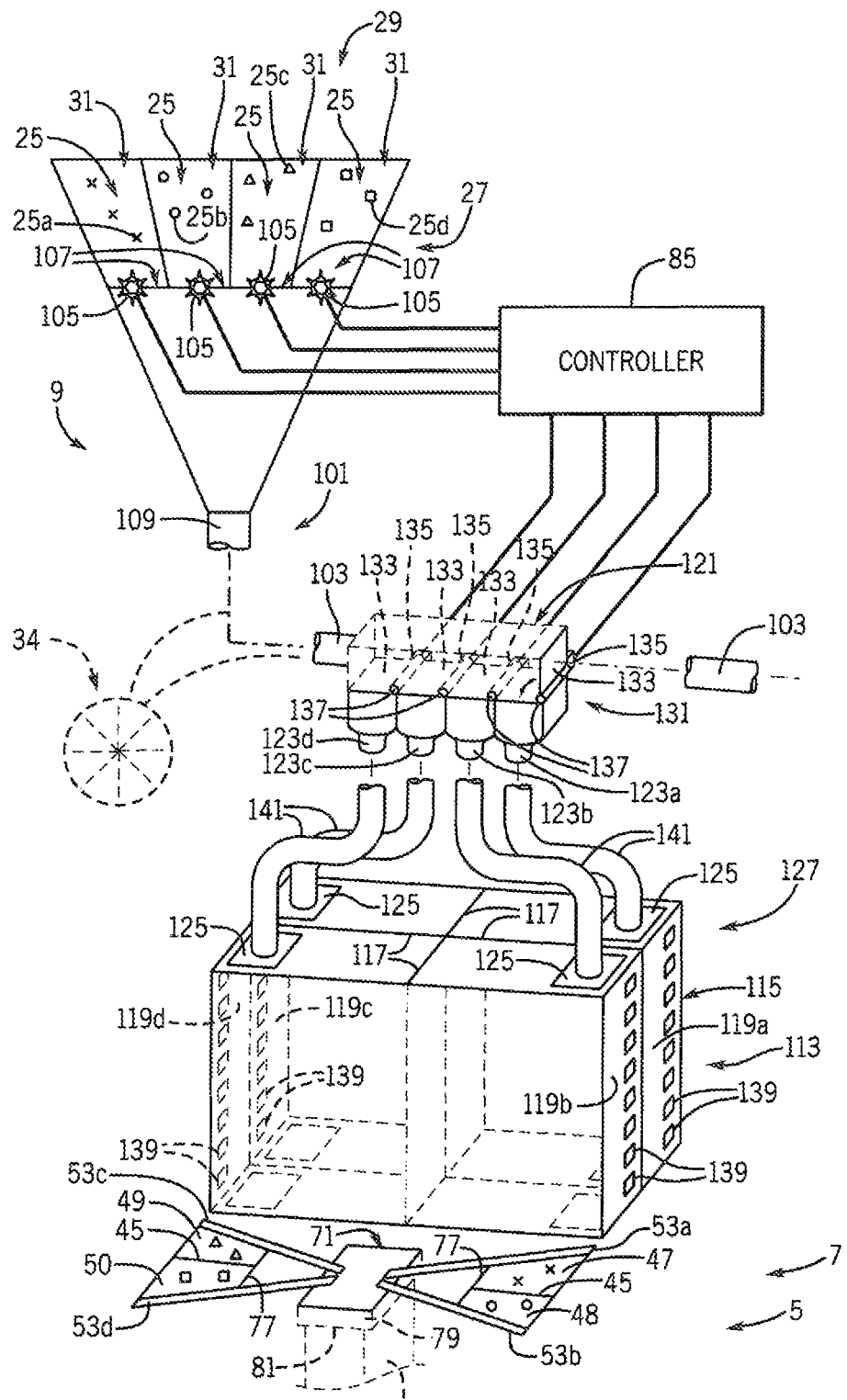
FIG. 5 illustrates a simplified schematic view of the planter of FIG. 1 with the seed meter of FIG. 3 and a variant of the diverter system of FIG. 4.

Referring now to FIGS. 4 and 5, the control system 85 controls the loading of the seed types 25a, 25b, 25c, 25d in the first second, third, and fourth second seed chambers 47, 48, 49, 50 of the seed meter reservoir 43 by controlling a primary feed system 101. The primary feed system 101 is shown as having a single primary seed conduit 103 to selectively direct the different seed types 25a, 25b, 25c, 25d into the first, second, third, and fourth seed chambers 47, 48, 49, 50. Seed metering rollers 105 which may be calibrated fluted rollers arranged at outlets 107 of the bulk fill hoppers 29, or the separate compartments 31 of a single bulk fill hopper 29 that holds the seed types 25a, 25b, 25c, 25d in its separate compartments 31. The rollers 105 are driven to rotate by electric, pneumatic, or hydraulic motors (not shown) as controlled by the control system 85 to control release of the seed types 25a, 25b, 25c, 25d from the respective compartment(s) 31 into a conduit segment 109 that connects to the primary seed conduit 103.

As shown in FIG. 4, in this embodiment, the primary seed conduit 103 connects to a diverter system 111 that selectively directs seed types 25a, 25b, 25c, 25d to an on-row storage system 113 that includes a vented mini-hopper 115. The mini-hopper 115 has orthogonally intersecting separator walls 117 that divide the interior space of the mini-hopper 115 into split compartments, shown as first, second, third, and fourth mini-hopper chambers 119a, 119b, 119c, 119d which feed into and are connected with the first, second, third, and fourth seed chambers 47, 48, 49, 50 of the seed meter reservoir 43. The control system 85 selectively fills and maintains seed pool level of the first and second mini-hopper chambers 119a, 119b, 119c, 119d by controlling the diverter system 111. The diverter system 111 has a diverter 121 defining a generally tubular body with outlet ducts 123a, 123b, 123c, 123d that connect directly in this embodiment to openings or inlets 125 of each of the mini-hopper chambers 119a, 119b, 119c, ii 9d at an inlet segment 127 of the mini-hopper 115.

Still referring to FIG. 4, the diverter system 111 includes a gate system 131 having gates 133 independently actuatable to close or open the outlet ducts 123a, 123b, 123c. 123d of the diverter 121 to respectively block or permit flow through passages extending through the outlet ducts 123a, 123b, 123c, 123d to control delivery into the first, second, third, and fourth mini-hopper chambers 119a. 119b. 119c, 119d. Each of the gates 133 is shown as a pivoting blade with an actuator 135 configured to open or close the gates 133 by pivoting the gates 133 about pins 137. The control system 85 controls the actuators 135 to open a single one of the gates 133 and close the remaining gates 133 at any given time in a manner that allows the single primary seed conduit 103 to direct the different seed types 25a, 25b, 25c, 25d into the respective mini-hopper chambers 119a, 119b, 119c, 119d assigned for storing that particular seed type types 25a, 25b, 25c, 25d. Seed level sensors 139 are arranged in the mini-hopper chambers 119a, 119b, 119c, 119d to provide signals allowing the control system 85 to evaluate how much seed 25 of the seed types 25a, 25b, 25c, 25d is in each of the four mini-hopper chambers 119a, 119b, 119c, 119d. In this way, the compartments 31 of the centrally located bulk fill hopper(s) 29 feed and maintain adequate fill level(s) of the seed types 25a, 25b, 25c, 25d in the mini-hopper chambers 119a, 119b, 119c, 119d by way of the diverter system 111, as controlled by the control system 85.

Referring now to FIG. 5, the seed meter 5, bulk storage system 27, primary feed system 101, diverter system 111, and on-row storage system 113, are mostly identical to those of FIG. 4, whereby such descriptions are applicable here. The diverter system 111 of FIG. 5 differs from that of FIG. 4 in the following ways. Unlike the diverter 121 being directly connected to the inlet segment 127 of the mini-hopper 115 as shown in FIG. 4, each diverter 121 of the row unit(s) 7 in the embodiment shown in FIG. 5 is provided within the primary seed conduit 103 itself or within an upstream branch of the primary seed conduit 103 relative to the mini-hopper 115 and thus upstream and spaced from the mini-hopper 115. In this arrangement, secondary seed conduits 141 extend from the outlet ducts 123a, 123b, 123c, 123d of the diverter 121 to respective ones of inlets 125 of the mini-hopper chambers 119a, 119b, 119c, 119d.

Figure 6:
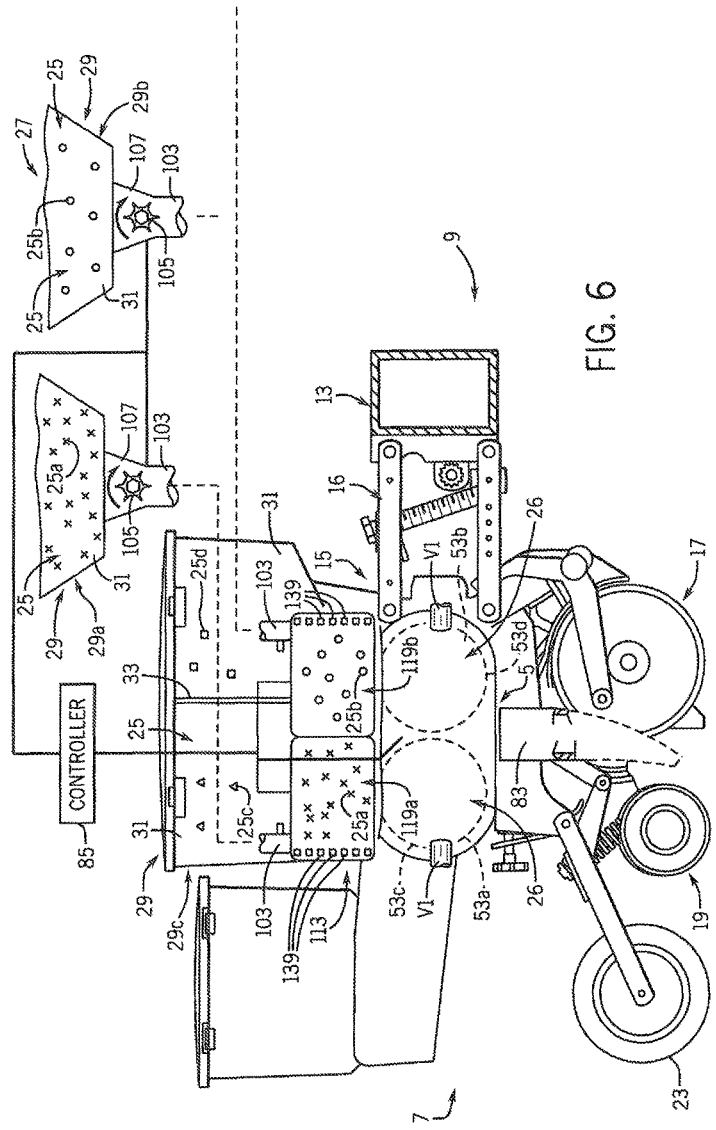
FIG. 6 illustrates a simplified side elevation of a portion of a planter incorporating a seed meter in accordance with the present invention with a bulk storage system having both central bulk fill hoppers and on-row bulk fill hoppers.
Figure 7:
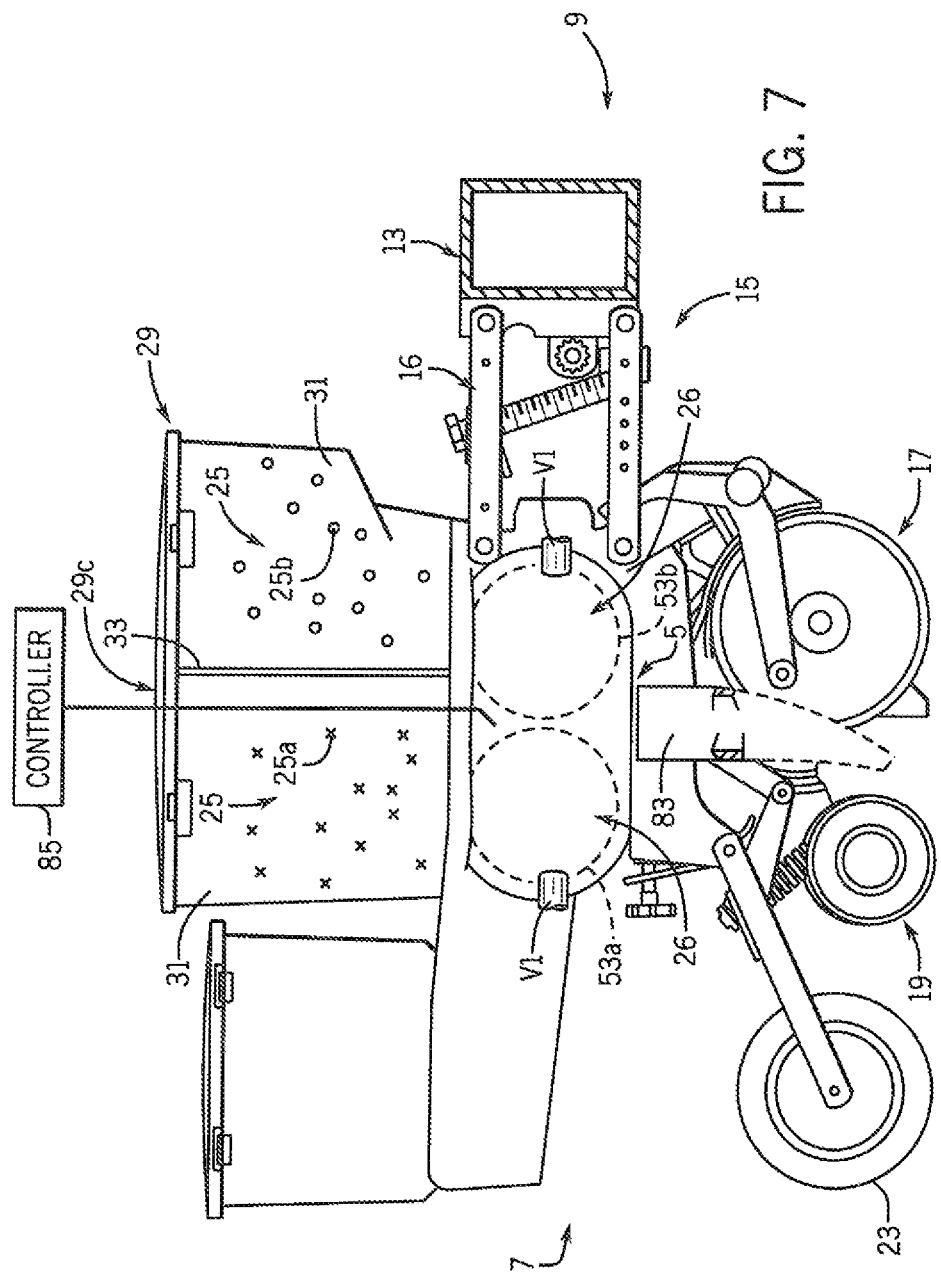
FIG. 7 illustrates a simplified side elevation of a portion of a planter incorporating a seed meter in accordance with the present invention with a bulk storage system having on-row bulk fill hoppers.

Even though all of the seed types 25a, 25b, 25c, 25d can be centrally stored in bulk in one or more bulk fill hoppers 29, such central bulk storage of seed 25 can be optional. In some embodiments, all four, optionally three, two, or one of the seed types 25a, 25b, 25c, 25d is stored centrally in bulk, with the balance of the seed types been supplied with an on-row hopper(s). In some embodiments, only on-row hoppers are used for bulk storage of the seeds 25. Referring now to FIGS. 6 and 7, these planters 9 have at least some on-row bulk seed storage. This can be in addition to or instead of the central bulk seed storage.

Referring now to FIG. 6, this is a variation of the system described above with respect to FIGS. 4 and 5 that includes both remote centrally located bulk storage and on-row bulk storage of seed 25. Instead of storing all of the seed types 25a, 25b, 25c, 25d in centrally-located bulk fill hoppers 29, FIG. 6 shows a variation in which only a seed type with a greater required use-volume seed type(s), shown as seed type(s) 25a, 25b corresponding to primary seed types, are stored in compartments 31 of the centrally located bulk fill hoppers 29 represented as seed types 25a, 25b stored in bulk fill hopper 29a, 29b. Relatively lesser required use-volume seed type(s), shown as seed types 25c, 25d as secondary seed types, are stored in bulk on-row in the compartment 31 of the on-row bulk fill hopper 29, represented as bulk fill hopper 29c. In this embodiment, within each seed meter 5 of the planter 9, different seed disks 53a, 53b, 53c, 53d are fed seeds 25 stored either centrally or on-row, with one or more of the seed disks 53a, 53b, 53c, 53d being fed from bulk on-row storage, as desired. In the embodiment shown in FIG. 6, the seed disks 53a and 53b are shown in dashed circles with the seed disk 53a toward the back of the row unit 7 and the seed disk 53b toward the front of the row unit 7, closest to the frame 13 of the planter 9. The seed disks 53c and 53d that are represented by dashed lead lines are behind the seed disks 53a and 53b in the view provided in FIG. 6, which would correspond to side-by-side relationships of seed disks 53c, 53d and 53a, 53b were viewed from the above according to this arrangement. The first metering assembly 26 has its seed disk 53a fed the first primary seed type 25a from the first mini-hopper chamber 119a of the mini-hopper 115, which itself pneumatically receives the primary seed type 25a from the remote and centrally located storage of the bulk fill hopper 29a. The second metering assembly 26 has its seed disk 53b fed the second primary seed type 25b from the second mini-hopper chamber 119b of the mini-hopper 115, which itself pneumatically receives the primary seed type 25b from the remote and centrally-located storage of the bulk fill hopper 29b. The seed disks 53c and 53d are gravity-fed the secondary seed types 25c, 25d from the compartments 31 on opposite sides of the partition 33 of the on-row bulk fill hopper 29c.

Referring now to FIG. 7, this embodiment shows all of the seed 25 stored on-row in bulk. This embodiment shows a single segmented on-row bulk fill hopper 29c with compartments 31 separated from each other by the partition 33. Seeds 25 of the seed types 25a, 25b are gravity-fed to the seed disks 53a, 53b, respectively, within the seed meter 5. Although shown with two compartments 31 within the on-row bulk fill hopper 29c that feed to seed disks 53a, 53b within the seed meter 5, it is fully appreciated that the on-row bulk fill hopper 29c may have another pair of compartments 31 and the seed meter 5 may have another pair of seed disks 53c, 53d fed by such pair of compartments behind those visible in this view, which would be in respective side-by-side relationships with each other if viewed from the above.

Referring again to FIGS. 2 and 3, regardless of the particular location(s) and configuration(s) of bulk storage of the seed 25 and the diverter system 111, the control system 85 is configured to control each seed meter 5 to switch, for example, absolutely, instantaneously, and automatically, between planting of different types or varieties of seed 25 during a single planting pass of row-crop planting of an agricultural field with the planter 9. This may be done according to predetermined criteria, for example, based on the variety zones VZ1, VZ2, VZ3, VZ4 of the agricultural field provided by the seed type or variety prescription map PM (FIG. 8), to accommodate selectively planting the seed types 25a, 25b, 25c, 25d based at least in part by characteristics relating to the soil type(s) and management type(s) of the variety zones VZ1, VZ2, VZ3, VZ4. The control system 85 can absolutely and instantaneously switch which one of the seed types 25a, 25b, 25c, 25d is being planted by activating and/or deactivating the seed disk assemblies 51a, 51b, 51c, 51 d to shut off three-quarters of the seed meter 5 and only deliver seed 25 from the quarter or quadrant of the seed meter 5 that is not shut off, in a precisely synchronized manner.

Still referring to FIGS. 2 and 3, each seed meter 5 has a seed disk drive system 143 that is controlled by the control system 85 for selectively activating and/or deactivating the seed disk assemblies 51a, 51b, 51c, 51d. Each of the seed meters 5 is shown with a direct drive-type seed disk drive system 143 having motor drives 145. The motor drives 145 may include pneumatic motors or electric motors that rotate the spindles 147 that attach to and drive rotation of the seed disks 53a, 53b, 53c, 53d. It is understood that the motor drives 145 may instead rotate the seed disks 53a, 53b, 53c, 53d by rotating hubs, outer peripheries, or other portions of the seed disks 53a, 53b, 53c, 53d or the drive system 143 may be configured as a non-direct drive system that drives rotation of the seed disks 53a, 53b, 53c, 53d by way of cooperating clutches, sprockets, chains, and traction driven or other rotating shafts. Regardless, the control system 85 is operably connected to each of the motor drives 145 or other components of the disk drive system 143 to either disengage and prevent transmission of the rotation driving power from the motor drives 145 or engage and permit transmission of the rotation driving power from the motor drives 145 or other power transmitting components of the disk drive system 143 to each of the seed disks 53a, 53b, 53c, 53d.

Still referring to FIGS. 2 and 3, the seed disks 53a, 53b of the forward pair 26a of metering assemblies 26 are rotated away from the forward facing wall 75 of the seed meter housing 35. The seed disks 53c, 53d of the rearward pair 26b of metering assemblies 26 are rotated toward the forward facing wall 75 of the seed meter housing 35. In this way, the seed disks 53a, 53b, 53c, 53d are configured to convey seeds 25 from relatively outwardly arranged storage quadrants defined by the seed chambers 47, 48, 49, 50 receiving seeds from the respective mini-hopper chambers 119a, 119b, 119c, 119d toward the single seed tube 83 at the intermediately defined discharge segment 71 of the seed meter housing 35.

Figure 8:
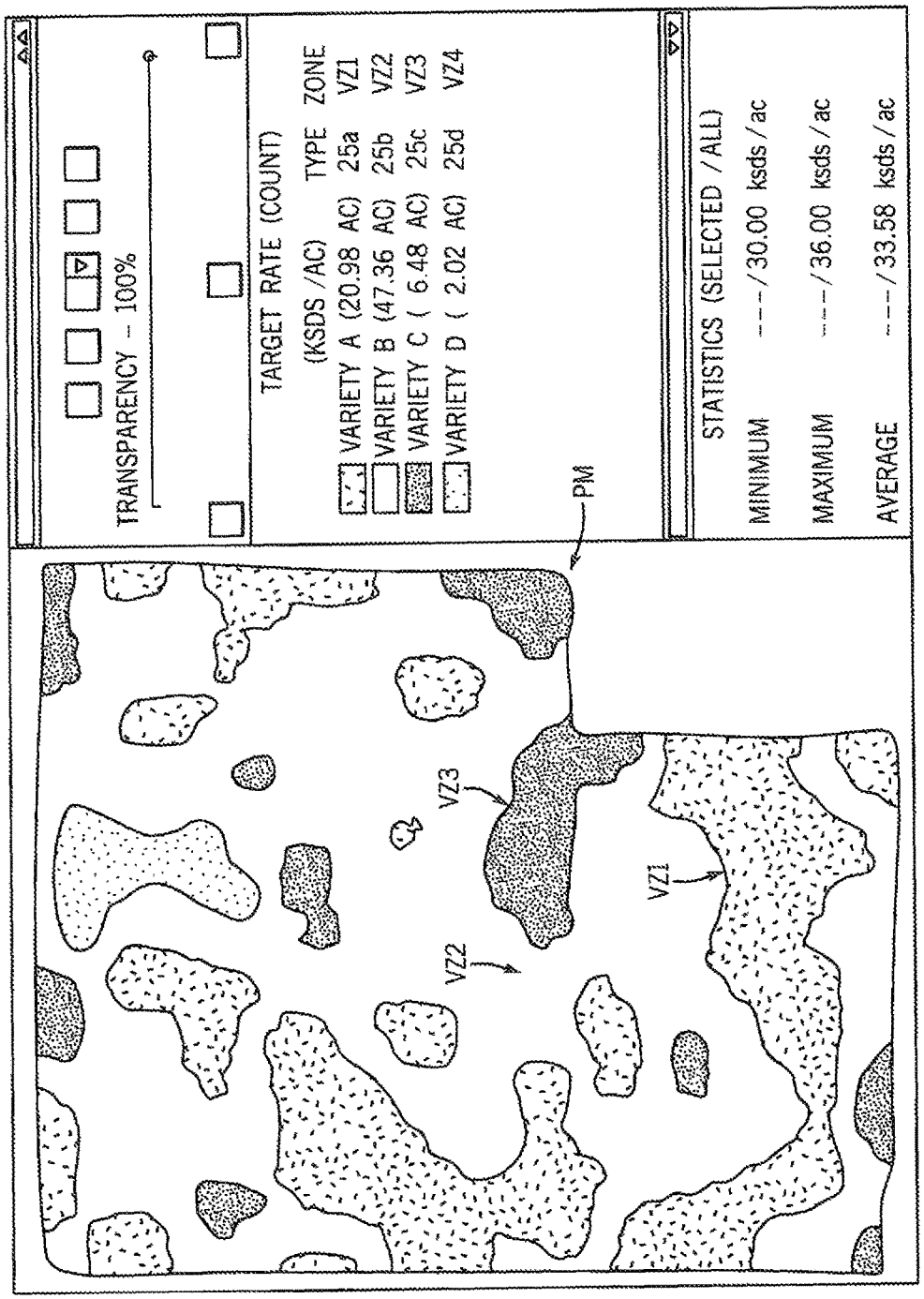
FIG. 8 illustrates a screen shot showing a seed-type prescription map for use with the planter incorporating the seed meter(s) in accordance with the present invention.

Referring now to FIGS. 2, 3, and 8, during use, an operator first displays the seed type or variety prescription map PM (FIG. 8) on the computer display or monitor of the tractor interface system 99, which would typically be inside the tractor cab. The prescription map PM displays which type or variety zones VZ1, VZ2, VZ3, VZ4 are located where in the agricultural field and which seed types 25a, 25b, 25c, 25d can be planted in the variety zones VZ1, VZ2, VZ3, VZ4. As shown in FIG. 6, in this embodiment, seed type 25a is shown as acceptable for use in variety zone VZ1, corresponding to a recommended variety A. Seed type 25b is shown as acceptable for use in variety zone VZ2, corresponding to a recommended variety B. Seed type 25c is shown as acceptable for use in variety zone VZ3, corresponding to a recommended variety C. Seed type 25d is shown as acceptable for use in variety zone VZ4, corresponding to a recommended variety D. The operator inputs which seed type 25a, 25b, 25c, 25d is stored in compartments 31 of the bulk storage system 27 through the tractor interface system 99. The prescription map PM may also contain the seed population that is to be planted for each type or variety 25a, 25b, 25c, 25d. The seed population could also be varied within the field based on soil type, organic matter, etc. The size of the seeds can also be input into the tractor interface system 99. This information could also be made available in the database that is built from the desktop software when the prescription map PM was created.

Referring again to FIGS. 4 and 5, the control system 85 then determines seed level, in each of the four mini-hopper chambers 119a, 119b, 119c, 119d based on a signal(s) from the corresponding seed level sensors 139. If the seed level in the mini hopper chambers 119a, 119b, 119c, 119d is below a certain predetermined level corresponding to an amount needed for making at least one planting pass or starting planting, then the control system 85 sends a signal to rotate the metering roller(s) 105 of the compartment 31 holding the seed type 25a, 25b, 25c, 25d that was determined to be low. This releases the particular low seed type(s) 25a, 25b, 25c. 25d from the bulk storage system 27 through the primary seed conduit 103. The control system 85 also sends a signal to actuate the gate 133 at the outlet duct 123a, 123b, 123c, 123d of the diverter 121 corresponding to the mini-hopper chambers 119a, 119b, 119c, 119d currently being filled to open that particular gate 133 and close all others within the diverter 121. This ensures that the seed types 25a, 25b, 25c, 25d released from the bulk storage system 27 is directed to the correct one of the mini-hopper chambers 119a, 119b, 119c, 119d of the of the mini-hopper 115. This process is repeated for each of the mini-hopper chambers 119a, 119b, 119c, 119d for which a low seed level is detected.

Referring again to FIGS. 2 and 3, by way of the OPS of the tractor controller 89, the control system 85 is able to determine which seed type(s) 25a, 25b, 25c. 25d is to be planted by each of the seed meters 5 based on the prescription map PM (FIG. 8). The control system 85 controls each seed meter 5 or its components to achieve the desired planting characteristics based on the prescription map PM and/or based on different characteristics of the different seed types 25a, 25b, 25c, 25d such as size, a target population density or spacing, or the like. This may include automatically adjusting at least one of a seed disk rotational speed for adjusting seed population, adjusting a seed singulator setting, turning on vacuum, turning off vacuum, adjusting vacuum level, adjusting baffle position, adjusting the seed pool level. Preferred settings for the seed meter 5 could also be preset by the operator and based on historical data or data provided by the seed 25 provider or planter 9 manufacturer. Adjustment of the seed meter 5 to obtain the preferred settings can also be done by adjusting the vacuum setting for each meter 5 manually or automatically controlled from inside the tractor cab through the tractor interface system 99. Similarly, a seed singulator and baffle of each seed disk assembly 51a, 51b, 51c, 51d of the seed meter 5 can be controlled manually or automatically through the control system 85 for each row unit 7, which may include making the actual physical adjustment(s) to the singulator and/or baffle, for example by way of an electrical solenoid or stepper motor attached to the singulator and/or baffle or the like which is controllable to make such adjustments. For example, if seed type 25a is to be planted from a particular row unit 7 of the planter 9, the control system 85 commands the seed disk drive system 143 to activate the seed disk assembly 51a and rotate and delivers seed 25 of seed type 25a from the seed disk 53a and commands the seed disk drive system 143 to deactivate the seed disk assemblies 51b, 51c, 51 d and prevent rotation of and delivery of seed 25 of seed types 25b, 25c. 25d from the seed disks 53b, 53c, 53d at the seed meter 5 of that particular row unit 7. In addition to rotating a corresponding seed disk 53a, 53b, 53c, 53d, the activating of the seed disk assembly 51a, 51b, 51c, 51d can include turning on vacuum that may have been shut off at the respective seed disk assembly 51a, 51b, 51c, 51d. This can be done by controlling a valve located at the vacuum inlet VI or otherwise operably between the vacuum inlet VI and the vacuum source. Activating the seed disk assembly 51a, 51b, 51c, 51d can further include charging or priming the respective seed disk 53a, 53b, 53c, 53d such as by applying vacuum and pre-rotating for a predetermined amount of time for a predetermined amount of rotation to ensure that the seeds are ready to plant. Further control of the seed meter 5 during activating and/or use of the seed disk assemblies 51a, 51b. 51c, 51d can include adjusting release timing and position of seeds from the respective seed disk 53a, 53b, 53c, 53d. This may include adjusting forward positioned or front seed disks 53a, 53b, 53c, 53d to release early or relatively earlier and adjusting rearward positioned or rear seed disks 53a, 53b, 53c, 53d to release late or relatively later to ensure that released seeds 25 are sent down the center of the seed tube 83. In addition to stopping rotation of a corresponding seed disk 53a, 53b, 53c, 53d, the deactivating of the seed disk assembly 51a, 51b, 51c. 51d can include turning off vacuum being applied at the respective seed disk assembly 51a, 51b, 51c, 51 d. This can be also be done by controlling a valve configured to adjusting or turning on and off vacuum applied at the seed disk assembly 51a, 51b, 51c, 51d. Deactivating the seed disk assembly 51a, 51b, 51c, 51d can further include un-priming the respective seed disk 53a, 53b, 53c, 53d such as by rotating the seed disk 53a, 53b, 53c, 53d in a reverse direction, away from the seed tube 83 before removing vacuum to avoid dropping seed down the seed tube 83 if vacuum is shut off at the seed disk 53a, 53b, 53c, 53d.

This synchronized activating and deactivating of the seed disk assemblies 51a, 51b, 51c, 51d provides a seed-type switching event. During the seed-type switching event, which may correspond to the planter 9 and/or tractor 11 crossing from one variety zone to another according the prescription map PM (FIG. 8) and detected by the OPS of the tractor controller tractor controller 89, release of a final seed 25 of the previously planted type is sequentially followed by an initial seed 25 of a subsequent or currently planted seed type. This can be done within a single row without creating a skip event, maintaining a constant in-row seed spacing through the seed-type switching event, whereby an in-row seed spacing at a transition between the first and second seed types is the same as the in-row seed spacing within each of the first and second seed types 25a, 25b, 25c, 25d. In one embodiment, the synchronized activating and deactivating of the seed disk assemblies 51a, 51b, 51c, 51 d is controlled to provide a mixed delivery of the different seed types 25a, 25b, 25c, 25d as a mixed distribution. The control system 85 can be programmed to specify a percentage of each of the different seed types 25a, 25b, 25c, 25d and the seed disks 53a, 53b, 53c, 53d are correspondingly activated and deactivated to alternate and synchronized delivery of the different seed types 25a, 25b, 25c, 25d in order to achieve the percentage or other metric of the mixed distribution. For example, the control system 85 can control the seed disk 5 to plant one seed of type 25a, two seeds of type 25b, one seed of type 25c, one seed of type 25d, or some other predetermined or other sequence to ensure overall correct population distribution is achieved.

Still referring to FIGS. 2 and 3, the control system 85 can be configured to individually control each of the seed meters 5 in this way to control switching from delivering seeds 25 of any one of the first, second, third, and fourth seed types 25a, 25b, 25c, 25d to delivering seeds 25 of a different one of the first, second, third, and fourth seed types 25a, 25b, 25c, 25d on a per-row basis. In another embodiment, the control system 85 is configured to control groups of seed meters 5 in the same way within the same section of the planter 9, for example, by giving common commands to all of the seed meters 5 within the same outer wing section(s) and/or inner or middle sections. This allows the control system 85 to control switching between delivery of seeds 25 of the different types 25a, 25b, 25c, 25d from the planter on a per-section basis. In yet another embodiment, the control system 85 is configured to control all of the seed meters 5 of the planter 9 in the same way. This allows for controlling switching between delivery of seeds 25 of the different types 25a, 25b, 25c, 25d on a whole-planter basis.

Many changes and modifications could be made to the invention without departing from the spirit thereof. The scope of these changes will become apparent from the appended claims.

We claim:

1. A seed meter for planting multiple types of seed in a single planting pass during row-crop planting of an agricultural field, the seed meter comprising:
   a housing supported relative to a row unit of a planter and having multiple portions defining multiple seed chambers respectively receiving seeds of multiple types from a bulk storage system; and
   multiple seed disk assemblies received in the housing, each seed disk assembly communicating with a corresponding one of the multiple seed chambers for selectively delivering individual seeds of the multiple seed types out of the housing for release onto an agricultural field during row-crop planting of the agricultural field.

2. The seed meter of claim 1 wherein the housing receives seeds from at least one bulk storage hopper supported at the row unit defining on-row bulk storage of the seed.

3. The seed meter of claim 1 wherein the multiple portions of the housing include,
   a first portion defining a first seed chamber for receiving seeds of a first type;
   a second portion defining a second seed chamber for receiving seeds of a second type;
   a third portion defining a third seed chamber for receiving seeds of a third type; and
   a fourth portion defining a fourth seed chamber for receiving seeds of a fourth type.

4. The seed meter of claim 3 further comprising a seed disk drive system configured for activating and deactivating the multiple seed disk assemblies for selectively delivering a corresponding one of the first, second, third, and fourth seed types out of the housing during row-crop planting of the agricultural field.

5. The seed meter of claim 4 wherein the multiple seed disk assemblies include a first seed disk rotatable within the housing for conveying seeds of the first seed type through the housing, a second seed disk rotatable within the housing for conveying seeds of the second seed type through the housing, a third seed disk rotatable within the housing for conveying seeds of the third seed type through the housing, and a fourth seed disk rotatable within the housing for conveying seeds of the fourth seed type through the housing.

6. The seed meter of claim 5 wherein the first and second seed disks define a first pair of seed disks and the third and fourth seed disks define a second pair of seed disks, the first pair are arranged at an angle with respect to each other within the housing of the seed meter and the seed disks of the second pair are arranged at an angle with respect to each other within the housing of the seed meter.

7. The seed meter of claim 6 wherein the first and second pairs of seed disks converge toward each other over a seed tube configured for receiving seeds released from each of the first, second, third, and fourth seed disks.

\* \* \* \* \*